(12) United States Patent
Noda

(10) Patent No.: US 6,956,810 B2
(45) Date of Patent: Oct. 18, 2005

(54) PHASE CHANGE OPTICAL INFORMATION RECORDING MEDIUM

(75) Inventor: Eiji Noda, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 293 days.

(21) Appl. No.: 10/256,110

(22) Filed: Sep. 25, 2002

(65) Prior Publication Data

US 2003/0058763 A1 Mar. 27, 2003

(30) Foreign Application Priority Data

| Sep. 25, 2001 | (JP) | .................................. 2001-291047 |
| Nov. 19, 2001 | (JP) | .................................. 2001-353386 |
| Jan. 30, 2002 | (JP) | .................................. 2002-022482 |

(51) Int. Cl.[7] ............................................... G11B 7/24
(52) U.S. Cl. .............................. 369/275.3; 369/275.2
(58) Field of Search ................... 369/275.4, 275.1, 369/44.26, 275.2, 275.3, 277, 278, 279; 428/64.3, 64.4, 64.1; 430/270.13

(56) References Cited

U.S. PATENT DOCUMENTS

| 4,861,637 A | 8/1989 | Ueda et al. .................... 428/65 |
| 4,915,997 A | 4/1990 | Yamamuro et al. ............. 428/64 |
| 5,213,947 A | 5/1993 | Ueda et al. ................. 430/271 |
| 5,325,348 A | 6/1994 | Maeda et al. ................ 369/100 |
| 5,648,952 A | 7/1997 | Maegawa et al. ........... 369/116 |
| 5,745,463 A | 4/1998 | Maegawa et al. ............. 369/59 |
| 5,790,482 A | 8/1998 | Saga et al. .................... 369/13 |
| 5,949,747 A | 9/1999 | Miyashita et al. ............ 369/54 |
| 5,956,313 A | 9/1999 | Maegawa et al. ........... 369/116 |
| 5,974,025 A | 10/1999 | Yamada et al. ............. 369/288 |
| 6,127,016 A | 10/2000 | Yamada et al. ............ 428/64.1 |
| 6,137,769 A | 10/2000 | Sawada et al. ........... 369/275.3 |
| 6,280,810 B1 | 8/2001 | Nakamura et al. ......... 428/64.1 |
| 6,373,802 B1 | 4/2002 | Hattori et al. ........... 369/53.27 |
| 6,388,978 B1 | 5/2002 | Ogawa et al. ............... 369/116 |
| 6,580,678 B2 * | 6/2003 | Kondo et al. ............ 369/275.2 |
| 6,600,707 B2 * | 7/2003 | Tsukada ................... 369/275.3 |
| 6,636,461 B2 * | 10/2003 | Tsukada et al. .......... 369/30.11 |
| 6,671,249 B2 * | 12/2003 | Horie ....................... 369/275.3 |
| 6,714,509 B2 * | 3/2004 | Kumagai et al. ......... 369/275.4 |
| 6,724,717 B2 * | 4/2004 | Noda ....................... 369/275.3 |

FOREIGN PATENT DOCUMENTS

| EP | 0286126 | 10/1988 |
| EP | 1158504 | 11/2001 |
| WO | 0041172 | 7/2000 |
| WO | 0118802 | 3/2001 |

OTHER PUBLICATIONS

Patent Abstracts of Japan, vol. 2000, No. 22 (Mar. 9, 2001), abstract of JP 2001–148140 A, May 29, 2001.
Patent Abstracts of Japan, vol. 1998, No. 01 (Jan. 30, 1998), abstract of JP 09–231018 A, Sep. 7, 1997.

* cited by examiner

Primary Examiner—Tan Dinh
(74) Attorney, Agent, or Firm—Cooper & Dunham LLP

(57) ABSTRACT

A phase change optical information recording medium including: a substrate; and a recording layer which is located overlying the substrate and in which marks are to be formed to store information, wherein the substrate includes plural sessions including a first session in which pits are formed and which includes a RAM region including a groove and a wobble signal, and a program memory area in which pits are formed and which includes position information of the first session and does not include disc ID information of the phase change optical information recording medium.

7 Claims, 8 Drawing Sheets

PHASE CHANGE OPTICAL INFORMATION RECORDING MEDIUM

BACKGROUND OF THE INVENTION

1. Field of the Invention

The present invention relates to an optical information recording medium, and particularly to a rewritable phase-change optical information recording medium for use as a CD-RW, DVD–RW, DVD+RW, etc. In addition, the present invention relates to a recording method and apparatus in which information is recorded in the optical information recording medium. Further, the present invention relates to an information recording method in which information is overwritten in the optical information recording medium. Furthermore, the present invention relates to an information erasing method.

2. Discussion of the Related Art

Conventional CD-RWs include a guide groove. As illustrated in FIG. 8, the guide groove is wobbled because wobble signals are recorded on entire the surface thereof in an irradiation process in stamping.

The wobble signals include time (address) information called ATIP (absolute time in pre-groove). ATIP is represented as, for example, "00m00s00f", wherein m represents minute, s represents second and f represents flame (i.e., $\frac{1}{75}$ second). In an area located before the point 00m00s00f, a PMA (program memory area) is present. In an area located between the PMA and the point 00m00s00f, "special information" and "additional information" which are important information concerning record/reproduction of the optical recording medium are recorded.

"Multi-session" is one of the file structures of rewritable optical information recording media and means a structure in which two or more sessions are recorded in an optical information recording medium. Each session includes a lead-in area (hereinafter sometimes referred to as a L/I or a L/I area), a data area (hereinafter sometimes referred to as a Data or a Data area) and a lead-out area (hereinafter sometimes referred to as a L/O or a L/O area).

FIGS. 1 and 2A–2F are schematic views illustrating data arrangement in conventional CD-RWs.

FIG. 1 is a schematic view illustrating arrangement of address data of a conventional CD-RW. Referring to FIG. 1, the area of from a point of 98m13s50f to a point of 98m27s00f is a program memory area (hereinafter sometimes referred to as a PMA). The area of from a point of 98m27s00f to a point of 99m59s74f is a L/I area. The area of from a point of 00m00s00f to a point of 75m42s00f is a Data area.

FIG. 2A is a schematic view illustrating a state of a CD-RW in which information is not recorded (i.e., a state of a CD-RW which is not used).

FIG. 2B is a schematic view illustrating a state of the CD-RW, in which a first session (i.e., L/I-1, Data-1 and L/O-1) is recorded in the CD-RW illustrated in FIG. 2A. In this case, information of disc ID D and first session position information 1 are recorded in this order from the inside of the PMA.

FIG. 2C is a schematic view illustrating a state of the CD-RW, in which a second session (i.e., L/I-2, Data-2 and L/O-2) is recorded in the CD-RW illustrated in FIG. 2B. In this case, the information of disc ID D, the first session information 1 and second session position information are recorded in this order from the inside of the PMA.

Information recorded in a phase change optical information recording medium can be erased. For example, all information recorded in a medium can be erased at once or only the last session of multiple sessions of a medium can be erased. At this point, erasure of information is performed by recording erasure signals.

FIG. 2D is a schematic view illustrating a state of the CD-RW, in which the last session (i.e., the second session) of the CD-RW illustrated in FIG. 2C is erased.

FIG. 2E is a schematic view illustrating a state of the CD-RW, in which the last session (i.e., the first session) of the CD-RW illustrated in FIG. 2D is erased. This state is logically the same as the state illustrated in FIG. 2A, however, they are different because erasure signals are recorded in the CD-RW illustrated in FIG. 2E whereas information is not recorded in the CD-RW illustrated in FIG. 2A.

FIG. 2F is a schematic view illustrating a state of the CD-RW in which all information is erased. This state is logically the same as the state illustrated in FIG. 2A, however, they are different because erasure signals are recorded in the CD-RW illustrated in FIG. 2F.

Recently, recordable optical information recording media having a ROM region, such as CD-Rs and CD-RWs, have been proposed. As one of the recordable optical information recording media, optical information recording media having a multi-session structure in which the first session is a ROM region including pits have been proposed.

A recording medium illustrated in FIGS. 3A to 3F is the same as that illustrated in FIGS. 2A to 2E except that the first session is a ROM region including pits.

FIG. 3A illustrates a CD-RW which is not used and which has a ROM region in which signals (L/I-1, Data-1 and L/O-1) are recorded by pits.

In the ROM region, pits and the groove formed between the pits are wobbled as illustrated in FIG. 9 to obtain wobble signals similarly to the signals in the RAM region.

FIG. 3B illustrates a state of the CD-RW, in which a second session (i.e., L/I-2, Data-2 and L/O-2) is recorded in the CD-RW illustrated in FIG. 3A.

FIG. 3C illustrates a state of the CD-RW, in which the last session (i.e., the second session) of the CD-RW illustrated in FIG. 3B is erased. This state is logically the same as the state illustrated in FIG. 3A, however, they are different because erasure signals are recorded in the CD-RW illustrated in FIG. 3C.

At this point, when the last session (i.e., the first session) is erased, the CD-RW achieves the state illustrated in FIG. 3D. In this case, since the signals recorded in the first session and the ROM signals in the PMA are not erased and erasure signals are recorded therein, the disc becomes incapable of recording and reproducing information thereafter.

FIG. 3E illustrates a state in which all information is erased. In this case, the disc also becomes incapable of recording and reproducing information thereafter similarly to the disc illustrated in FIG. 3D.

Thus, these media have drawbacks in that controlling of recording and erasing is difficult, and erasure signals are recorded in the ROM region by mistake, thereby making the media incapable of recording or erasing information.

When performing direct overwriting on a phase change optical information recording medium, information is recorded by allowing the recording layer thereof to achieve an amorphous state and information is erased by allowing the recording layer to achieve a crystallized state. The strength of the reflection signals of the recording layer achieving an amorphous state is called a pit level, and the strength of the reflection signals of the recording layer achieving a crystallized state is called a land level.

Direct overwriting is conventionally performed on a phase change optical information recording medium by applying a writing power (Pw) which is determined according to a γ method described in the Orange Book and which depends on the drive used and an erasure power (Pe) which is determined as a product of the writing power (Pw) and a constant (ε).

According to this method, when the writing power (Pw) is relatively high compared to the optimum value thereof, the erasure power (Pe) also increases. Therefore the direct overwriting is performed while applying an excessive erasure power and thereby the recording layer tends to achieve an amorphous state, resulting in decrease of the land level. Therefore, problems such that jitter increases and durability of the recording layer deteriorates occur.

In contrast, when the writing power (Pw) is relatively low compared to the optimum value thereof, the erasure power (Pe) also lowers, and thereby the previously recorded signals cannot be fully erased. Therefore, a problem in that jitter increases occurs.

As another erasing method, a CW (or physical) erasure method, in which erasure is performed by steady laser irradiation, is described in the Orange Book. However, the optimum erasure power (Peo), which is changed by the OPC (optimization of the writing power) while depending on the optimum writing power (Pwo) which is determined according to the γ method described in the Orange Book, is not proper for the CW erasure power (Pecw). Specifically, the portion on which the CW erasure is performed has deteriorated direct overwriting properties. Therefore, logical erasure methods in which direct overwriting of erasure patterns is performed are used for normal erasure.

In addition, hybrid discs which have a ROM region in a portion thereof, which ROM region is formed by a stamper, will be practically used shortly. When logical erasure is performed on the hybrid discs, direct overwriting is performed on the ROM region thereof, and thereby the hybrid discs become incapable of reproducing information.

SUMMARY OF THE INVENTION

Accordingly, an object of the present invention is to provide a rewritable phase change optical information recording medium in which information is recorded and erased while the recording and erasing are easily controlled (i.e., write protection is easily performed).

Another object of the present invention is to provide a rewritable phase change optical information recording medium in which erasing signals are not recorded in the ROM region thereof.

Yet another object of the present invention is to provide an information recording (and reproducing) method and apparatus in which information is recorded and erased while recording and erasing are easily controlled (i.e., while write-protection is easily performed).

A further object of the present invention is to provide an information recording method and apparatus in which direct overwriting is performed on an optical information recording medium while determining an optimum CW erasure power.

A still further object of the present invention is to provide an information erasing method by which information recorded in a hybrid disc is securely erased.

To achieve such an object, the present invention contemplates the provision of a phase change optical information recording medium including: a substrate; and a recording layer which is located overlying the substrate and in which marks are to be formed to store information, wherein the substrate includes plural sessions including a first session in which pits are formed and which includes a RAM region including a groove and a wobble signal, and a program memory area in which pits are formed and which includes positional information of the first session and does not include disc ID information of the phase change optical information recording medium.

The first session of the optical information recording medium further includes a ROM region including a data area including no wobbling signal.

The recording medium preferably has a structure in which at least a first dielectric layer, the recording layer, a second dielectric layer, a reflection layer and an overcoat layer are formed on one side the substrate in this order.

The recording layer preferably includes Ag, In, Sb and Te as main components with respective atomic percents $\alpha$, $\beta$, $\gamma$ and $\delta$ thereof being in the relationship of $\alpha+\beta+\gamma+\delta=100$, $0<\alpha\leq10$, $2\leq\beta\leq12$, $55\leq\gamma\leq70$ and $22\leq\delta\leq32$.

Alternatively, the recording layer preferably includes Ge, Ga, Sb and Te as main components with respective atomic percents $\alpha$, $\beta$, $\gamma$ and $\delta$ thereof being in the relationship of $\alpha+\beta+\gamma+\delta=100$, $0<\alpha\leq10$, $1<\beta12$, $55<\gamma\leq85$ and $12<\delta<32$.

The recording layer preferably further includes at least one element selected from the group consisting of 3B group elements, 4B group elements and 5B group elements in an amount not greater than 5 atomic %.

In another aspect of the present invention, an information recording apparatus is provided which includes:

receiving means for receiving an order to record or erase information in a phase change optical information recording medium;

reading means for reading a position of disc ID information stored in a program memory area of the phase change optical information recording medium and position information of plural sessions of the phase change optical information recording medium;

recording/erasing means for recording and erasing information in the plural sessions; and controlling means for controlling the recording/erasing means to record or erase the information in one or more of the plural sessions according to the order when the position information of the one or more sessions is located after the disc ID information in the program memory area, or refusing the order when the position information of the one or more of the plural sessions located before the disc ID information in the program memory area.

The controlling means may further have a function of ordering the recording/erasing means to rewrite the disc ID information such that the position of the ID information is changed to record and erase the information in the one or more of the plural sessions.

It is preferable that the information recording apparatus preferably includes a memory storing session information concerning recordable and erasable sessions, and the controlling means further has a function of referring to the session information when the receiving means receives an erasure order for a last session of the plural sessions in the optical information recording medium to determine whether or not the last session is an erasable session, and ordering the recording/erasing means to erase the last session when the last session is a recordable and erasable session or refusing the erasure order when the last session is not a recordable and erasable session.

It is preferable that the memory stores session information concerning non-recordable and non-erasable sessions, and the controlling means further have a function of referring to the session information stored in the memory when the receiving means receives a complete erasure order for the plural sessions in the phase change optical information recording medium to determine whether or not a non-recordable and non-erasable session is present in the memory, and ordering the recording/erasing means to perform the complete erasure order when a non-recordable and non-erasable session is not present in the memory or refusing the complete erasure order when a non-recordable and non-erasable session is present in the memory.

In yet another aspect of the present invention, an information recording apparatus is provided which records information in a phase change optical information recording medium including plural sessions each including at least one of a ROM region not including a wobble signal and a RAM region including a wobble signal and which includes:

receiving means for receiving an erasure order for a session;

judging means for checking whether a wobble signal is present in the session to determine whether the session does not include a ROM region; and erasing means for erasing the session when the session does not include a ROM region.

In a further aspect of the present invention, an information recording/erasing method is provided in which information is recorded and erased in a phase change optical information recording medium including a program memory area and plural sessions and which includes the steps of:

reading position information of disc ID information on the program memory area and position information of the plural sessions of the phase change optical information recording medium; and recording and erasing information in one or more of the plural sessions upon receiving of an order to record or erase the information when the position information of the one or more of the plural sessions is located after the disc ID information, or refusing the order to record and erase the information when the position information of the one or more of the plural sessions is located before the disc ID information.

The method preferably further includes rewriting the disc ID information such that the position of the ID information is changed to control recording and erasing of information in the one or more of the plural sessions.

In a still further aspect of the present invention, an information recording method is provided in which information is recorded in a phase change optical information recording medium including plural sessions each including at least one of a ROM region not including a wobble signal and a RAM region including a wobble signal and which includes the steps of:

checking whether a wobble signal is present in a session to determine whether the session does not include a ROM region upon receiving an erasure order for the session; and erasing the session when the session does not include a ROM region.

In a still further aspect of the present invention, a method for determining an optimum CW erasure power for erasing information in a phase change information recording medium, is provided which includes the steps of:

CW-erasing HF signals, which are recorded in the phase change information recording medium with a fixed writing power while changing an erasure power Pe;

measuring a pit level I11L or both the pit level I11L and a land level I11H of a remaining 11t signal of the HF signals;

determining the optimum CW erasure power Pecw such that the following relationship (1) is satisfied:

$$Pe1+0.05 \times \Delta Pe \leq Pecw \leq Pe2-0.05 \times \Delta Pe \quad (1)$$

wherein Pe1 represents a Pe when $d(I11L)/d(Pe)$ is maximized, Pe2 represents a Pe when $d(I11L)/d(Pe)$ is minimized, and $\Delta Pe$ represents Pe2−Pe1.

Alternatively, the optimum erasure power Pecw may be determined such that the following relationship (2) is satisfied:

$$I11L/I11H > 0.8 \quad (2).$$

In the method, the fixed writing power is preferably higher than an optimum writing power (Pwo) determined by a γ method. In addition, the CW-erasing step is preferably performed at a linear speed of the phase change optical information recording medium that is higher than the maximum recording linear speed of the phase change optical information recording medium.

In a still further aspect of the present invention, a method of directly overwriting information in a phase change optical information recording medium is provided which includes the step of:

first recording information in the phase change optical information recording medium by applying a writing power and an erasure power thereto to record HF signals therein while the writing power is changed and the erasure power is fixed;

measuring a mark-length/pit-length balance β of the HF signals;

determining an optimum writing power such that the mark-length/pit-length balance β is from 0 to 8%; and second recording information in the phase change optical information recording medium while applying the optimum writing power to the phase change optical information recording medium.

In still further aspect of the present invention, an optical information recording method is provided which includes the steps of performing CW erasing on a phase change optical information recording medium (a hybrid disc) having a ROM region formed by a stamper, by applying an erasure power thereto, wherein the erasure power is determined by the CW erasure power determination method mentioned above.

These and other objects, features and advantages of the present invention will become apparent upon consideration of the following description of the preferred embodiments of the present invention taken in conjunction with the accompanying drawings.

DESCRIPTION OF THE PREFERRED EMBODIMENTS

At first, the phase change optical information recording medium (hereinafter sometimes referred to as the recording medium) of the present invention will be explained in detail.

Figure 15:
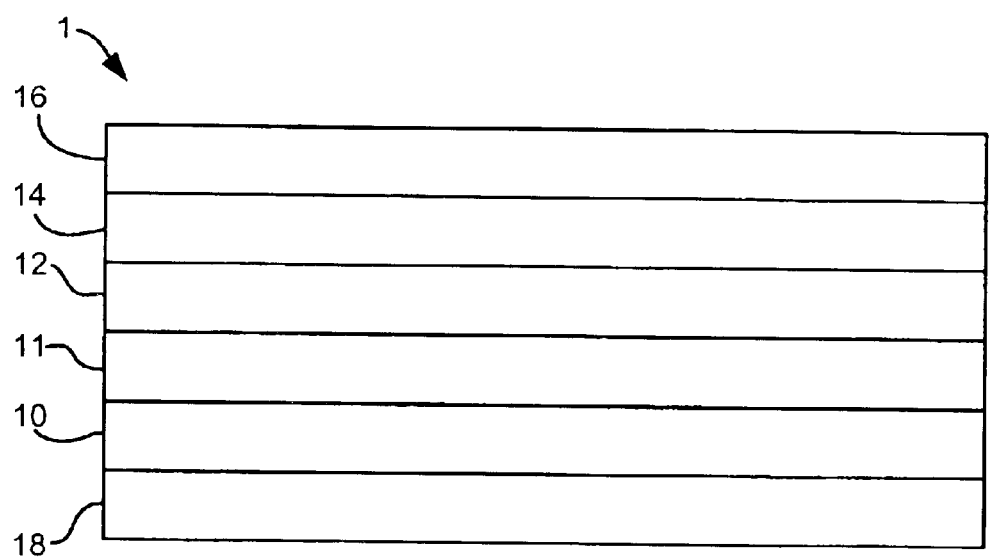
FIG. 15 is a schematic cross-sectional view of an embodiment of the phase change optical information recording medium of the present invention.

Referring to FIG. 15, the recording medium 1 of the present invention (in particular, CD-RW) typically has a constitution in which a first dielectric layer 10, a recording layer 11, a second dielectric layer 12, a reflection layer 14 made of a metal or a metal alloy, and an overcoat layer 16 are formed on one side of a substrate 18 having a guide groove. More preferably, a print layer is formed on the overcoat layer and a hard-coat layer is formed on the other side of the substrate.

The substrate is typically made of a material such as glass, ceramics and resins.

Specific examples of the resins for use as the substrate include polycarbonate resins, acrylic resins, epoxy resins, polystyrene resins, acrylonitrile-styrene copolymers, polyethylene resins, polypropylene resins, silicone resins, fluorine-containing resins, ABS resins, and urethane resins. Among these resins, polycarbonate resins and acrylic resins are preferable in view of moldability, optical properties and cost.

The shape of the substrate is not limited to disc shapes and, for example, card-form and sheet-form substrates can also be used.

When the recording medium of the present invention is used as a rewritable compact disc (CD-RW), the recording medium preferably meets the following conditions:

(1) the width of the guide groove formed on the substrate is from 0.25 to 0.65 μm and preferably from 0.30 to 0.60 μm, and the depth thereof is from 150 to 550 Å and preferably from 200 to 450 Å;

(2) the width of the pits formed on the substrate is from 0.25 to 0.80 μm and preferably from 0.30 to 0.70 μm, and the depth thereof is from 650 to 1300 Å and preferably from 800 to 1100 Å; and (3) the width of the inter-pit guide groove formed on the substrate is from 0.25 to 0.80 μm and preferably from 0.30 to 0.60 μm, and the depth thereof is from 150 to 550 Å and preferably from 200 to 450 Å.

The requisites for the phase change optical information recording medium of the present invention are to have not only a function of recording and erasing information but also a signal reproduction stability and a long life. In order to fulfill such requisites, the recording layer thereof preferably includes at least Ag, In, Sb and Te as main elements with respective atomic percents of $\alpha$, $\beta$, $\gamma$ and $\delta$ thereof being in the relationship of $\alpha+\beta+\gamma+\delta=100$, $0<\alpha\leq10$, $2\leq\beta\leq12$, $55\leq\gamma\leq70$ and $22<\delta<32$.

When the contents of Ag, In and Sb exceed the upper limits (i.e., 10, 12 and 70 atomic %, respectively), the reproduction stability and life of signals recorded in the recording layer are not satisfactory.

The content of Te influences on the recording linear speed of the recording medium, and therefore the content is preferably controlled to be in a range of from 22 to 32 atomic % even when the thickness of the recording layer and the heat conductivity of the other layers are properly controlled.

Deterioration of reproduction properties and life of recorded signals is caused by crystallization of amorphous marks. In order to improve the reproduction stability and life of recorded signals (i.e., in order to prevent amorphous marks from crystallizing), at least one element selected from the groups consisting of 3B elements, 4B elements and 5B elements is preferably included in the recording layer.

The reason therefor is not clear, but is considered to be that such an element can be located in spaces of AgInSbTe and/or can form a chemical bonding with AgInSbTe, and thereby the crystallization of amorphous marks can be prevented. Therefore it is effective to use an element having a small atomic diameter, large chemical bonding with AgInSbTe and many bonding sites. From this point of view, elements such as B, C, N, Si, Ge and Sn are preferable.

The content of such an element in the recording layer is preferably not greater than 5 atomic %. When the content is too high, the recording/erasing characteristics of the AgInSbTe recording layer deteriorate, and thereby a problem in that recorded information cannot be fully erased occur.

In addition, recording is performed on the recording medium of the present invention at a high linear speed, the recording layer preferably includes at least Ge, Ga, Sb and Te as main elements with respective atomic percents of α, β, γ and δ thereof being in the relationship of α+β+γ+δ=100, 0<α≦10, 1≦β12, 55≦γ≦85 and 12≦δ<32

When the contents of Ge, Ga and Sb exceed the upper limits (i.e., 10, 12 and 85 atomic %), the reproduction stability and life of signals recorded therein are not satisfactory.

The content of Te influences on the recording linear speed of the recording medium, and therefore the content is preferably controlled to be in a range of from 22 to 32 atomic % even when the thickness of the recording layer and the heat conductivity of the other layers are properly controlled.

Similarly to the AgInSbte recording layer, deterioration of reproduction properties and life of recorded signals is caused by crystallization of amorphous marks. In order to improve the reproduction stability and life of recorded signals (i.e., in order to prevent amorphous marks from crystallizing), at least one element selected from the groups consisting of 3B elements, 4B elements and 5B elements is preferably included in the GeGaSbTe recording layer.

The reason therefor is the same as mentioned above in the AgInSbte recording layer.

The content of the additional element included in the GeGaSbTe recording layer is preferably not greater than 5 atomic % for the same reason as mentioned above in the AgInSbte recording layer.

The recording layer preferably has a thickness of from 10 to 50 nm and more preferably from 12 to 30 nm. In view of initial characteristics such as jitter, overwriting characteristics and productivity, the thickness is even more preferably 14 to 25 nm. When the recording layer is too thin, light absorption ability thereof deteriorates. Therefore the recording layer does not function. To the contrary, when the recording layer is too thick, uniform phase change does not occur when high speed recording and erasing are performed.

The recording layer can be prepared by a method such as vapor-phase growth methods, e.g., vacuum vapor deposition methods, sputtering methods, plasma CVD methods, light CVD methods, ion plating methods, electron beam deposition methods, etc. Among these methods, sputtering methods are preferable because the methods have good productivity and the resultant film has good film properties.

Suitable materials for use in the first and second dielectric layers include metal oxides such as SiO, $SiO_2$, ZnO, $SnO_2$, $Al_2O_3$, $TiO_2$, $In_2O_3$, MgO and $ZrO_2$; nitrides such as $Si_3N_4$, AlN, TiN, BN and ZrN; sulfides such as ZnS, $In_2S_3$ and $TaS_4$; carbides such as SiC, TaC, $B_4C$, WC, TiC and ZrC; and diamond-like carbon. These materials can be used alone or in combination.

In addition, the material used in the first and second dielectric layers can include impurities if desired. Further, the each of the layers can be a multi-layer type dielectric layer. The first and second dielectric layers have a melting point higher than that of the recording layer.

The first and second dielectric layers can also be prepared by a method such as vapor-phase growth methods, e.g., vacuum vapor deposition methods, sputtering methods, plasma CVD methods, light CVD methods, ion plating methods, electron beam deposition methods, etc. Among these methods, sputtering methods are preferable because the methods have good productivity and the resultant film has good film properties.

The thickness of the first dielectric layer largely influences on the reflectance of the recording medium against light having a wavelength of 650 nm, which is used for reproducing information stored in a DVD. In order to impart a reflectance of from 0.15 to 0.25 (specification of CD-RW) against light having a wavelength of 780 nm or 650 nm to the recording medium, the first dielectric layer preferably has a thickness of from 65 to 130 nm.

The second dielectric layer preferably has a thickness of form 15 to 45 nm and more preferably from 20 to 40 nm. When the second dielectric layer is too thin, the layer does not function as a heat resistant protective layer and in addition the sensitivity of the resultant recording medium deteriorates. In contrast, when the second dielectric layer is too thick, a problem in that the second dielectric layer releases from the recording layer occurs.

Suitable materials for use in the reflection layer include metals such as Al, Au, Ag, Cu and Ta, and metal alloys of the metals. In addition, an element such as Cr, Ti, Si, Cu, Ag, Pd and Ta can be added in the reflection layer. The reflection layer can be prepared by a method such as vapor-phase growth methods, e.g., vacuum vapor deposition methods, sputtering methods, plasma CVD methods, light CVD methods, ion plating methods, electron beam deposition methods, etc.

The reflection layer preferably has a thickness of from 70 to 200 nm and more preferably from 100 to 160 nm.

In order to prevent oxidation of the reflection layer, an overcoat layer is preferably formed on the reflection layer. The overcoat layer is typically formed by spin coating an ultra violet crosslinking resin. The overcoat layer preferably has a thickness of from 5 to 15 $\mu$m. When the overcoat layer is too thin, the error rate increases if a print layer is formed on the overcoat layer. To the contrary, when the overcoat layer is too thick, internal stress seriously increases, resulting in deterioration of the mechanical characteristics of the resultant recording medium.

The hard-coat layer is typically formed on the other side of the substrate by spin coating an ultraviolet crosslinking resin. The thickness of the hard-coat layer is preferably from 2 to 6 $\mu$m. When the hard-coat layer is too thin, good abrasion resistance cannot be imparted to the resultant recording medium. In contrast, when the hard-coat layer is too thick, internal stress seriously increases, resulting in deterioration of the mechanical characteristics of the resultant recording medium.

The hard-coat layer preferably has a high hardness, i.e., a pencil hardness not less than H, so as not to be scratched when rubbed with a cloth. In addition, an electroconductive material can be included therein to prevent the resultant recording medium from charging or being dusted.

Then the method of determining a CW erase power will be explained in detail.

Figure 10:
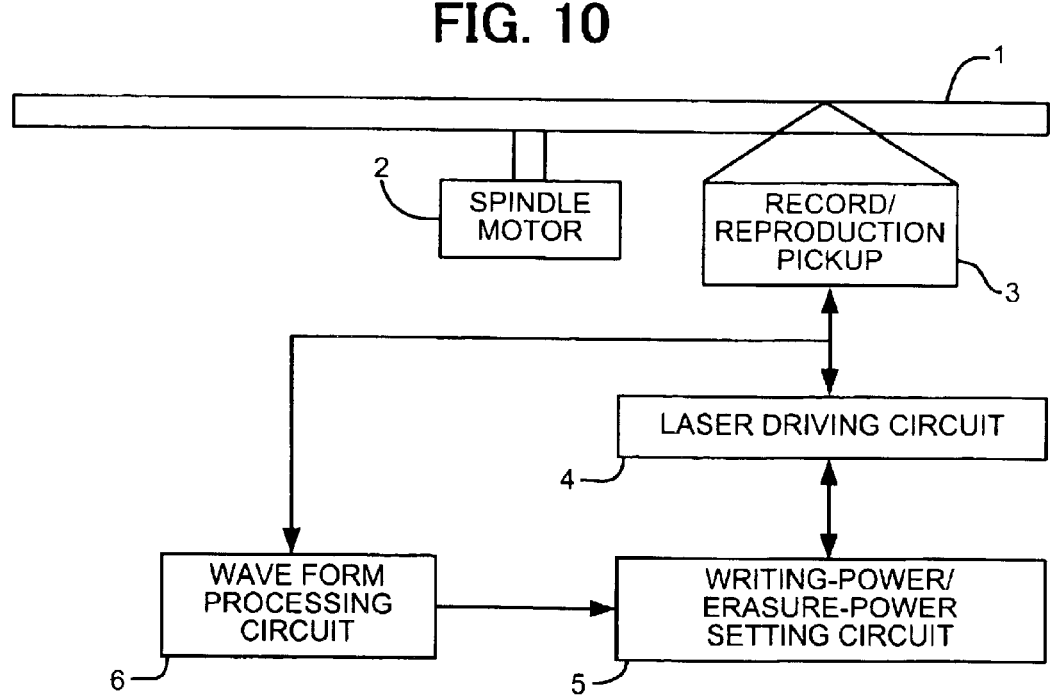
FIG. 10 is a schematic view illustrating an embodiment of the information recording/reproducing apparatus of the present invention.

FIG. 10 illustrates an information recording/reproducing apparatus of the present invention which can record and reproduce information in the phase change optical information recording medium of the present invention.

Referring to FIG. 10, numeral 1 denotes an optical information recording medium, i.e., the phase change optical information recording medium of the present invention. The recording medium 1 is rotated by a driving device including a spindle motor 2. A laser driving circuit 4, which is light source driving means, drives a light source including a laser diode. A record/reproduction pickup 3 irradiates the recording medium 1 with laser light, which is emitted by the laser diode via an optical system (not shown) and which is an electromagnetic wave, to cause a phase change in the recording layer of the recording medium 1.

When light irradiates the thus phase-changed recording layer and the reflected light is received by the record/reproduction pickup 3, the recorded information can be reproduced. A wave form processing circuit 6 measures the signal level of the reproduced HF signals to determine the optimum CW erase power (Pecw) and optimum writing power (Pwo) The optimum writing power of the record/reproduction pickup 3 is set by a writing-power/erasure-power setting circuit 5.

The information recording/reproducing apparatus irradiates the recording medium 1 with laser light serving as an electromagnetic wave to cause a phase change in the recording layer of the recording medium 1, resulting in recording or reproducing of information therein of rewriting of information. The apparatus includes a recording device which includes the record/reproduction pickup 3 and a modulator which modulates signals to be recorded.

The recording device including the pickup 3 performs PWM recording on the recording layer of the recording medium 1, in which signals are recorded by forming marks while changing the width of the marks. When recording is performed, signals to be recorded are modulated by the modulator using a clock. Suitable modulation methods include Eight-to-Fourteen-Modulation (EFM) methods, modified modulation methods of the EFM methods, etc.

Figure 11:
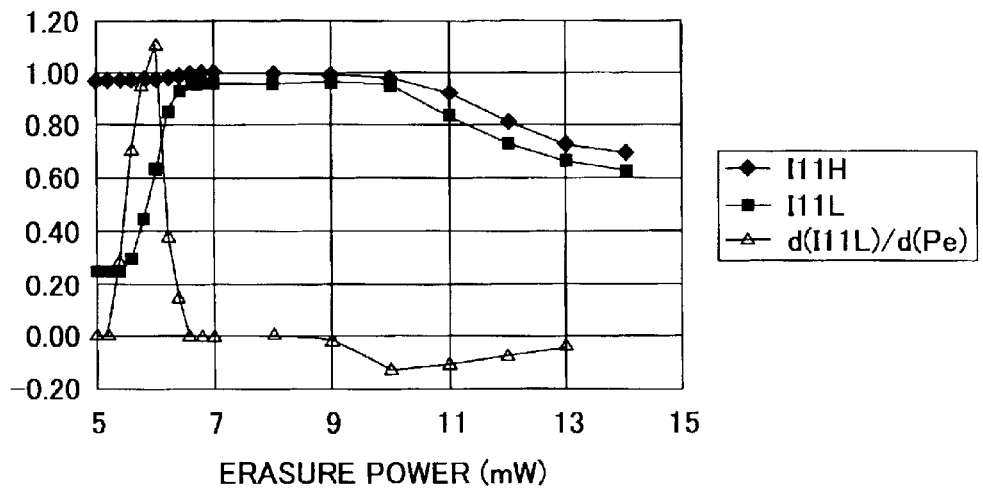
FIG. 11 is a graph illustrating a relationship between an erasure power and a residual signal level.

FIG. 11 illustrates a relationship between an erasure power (Pe) and a land level (I11H), a pit level (I11L) and d(I11L)/d(Pe) of the residual signal 11T when signals are recorded in an initialized phase change optical information recording medium and the recorded signals are erased by a CW method. As can be understood from the graph, when the value d(I11L)/d(Pe) is maximum, the CW erasure power (Pe1) is 6.0 mW, and when the value d(I11L)/d(Pe) is minimum, the CW erasure power (Pe2) is 10.2 mW. The difference (ΔPe) (i.e., Pe2−Pe1) is 4.2 mW.

At this point, the optimum CW erase power (Pecw) is defined as a power at which the resultant recording medium has a small residual signal amplitude and a small reflectance decrease. In the case of this phase change optical information recording medium, the optimum CW erasure power (Pecw) ranges from 6.2 to 10.0 mW.

In order to measure the residual signal amplitude, the HF signals are preferably recorded at a power greater than the optimum writing power (Pwo) which is determined by a γ method such that the resultant signals tend to remain even when erased. When the optimum CW erase power (Pecw) is determined by such a method, signals having a large signal amplitude can be well erased by applying the optimum CW erasure power.

From the results mentioned above, the following relationship can be obtained.

$$Pe1+0.05\times\Delta Pe \leq Pecw \leq Pe2-0.05\times\Delta Pe$$

When calculating to one places of decimals by rounding in view of effective digits, the relationship is as follows:

$$6.2 \leq Pecw < 10.0.$$

In view of efficient use of a laser diode (LD), the smaller the optimum CW erasure power (Pecw), the better the efficiency. Therefore, in the case of this phase change optical information recording medium, the optimum CW erasure power (Pecw) is 6.2 mW.

By applying such an erasure power, the land level (I11H) and pit level (I11L) satisfy the following relationship:

$$I11L/I11H > 0.8.$$

When a CW erase method is used, erasure can be performed at a relatively high linear speed compared to direct overwrite methods in which marks have to be formed while erasure is performed, and erasure can be performed at a higher speed than that in logical erasing.

Figure 12:
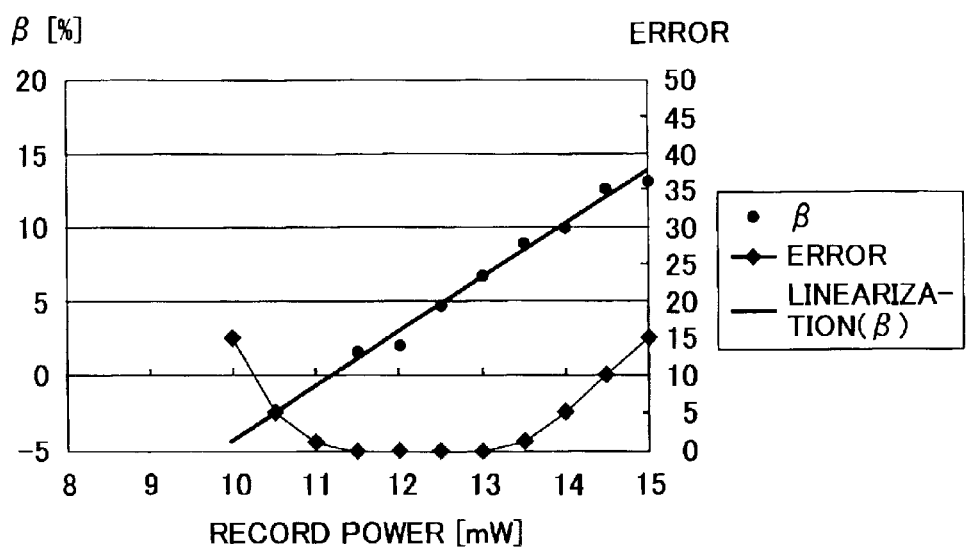
FIG. 12 is a graph illustrating a relationship between a record power and β(mark length/pit length balance of EFM signals) and error.

FIG. 12 illustrates a relationship between β and a writing power (Pw) when signals are recorded at an erasure power (Pe) of 6.2 mW (i.e., at the optimum erasure power (Pecw)). At this point, β represents a balance of mark length and pit length. When β ranges from 0 to 8%, errors hardly occur.

As can be understood from the graph in FIG. 12, when Pe is fixed, β and Pw have a primary correlation, and therefore linearization can be used. It can be understood from the graph that when Pw is 12.3 mW, β is 4%, and therefore well-balanced EFM signals can be obtained.

Figure 13:
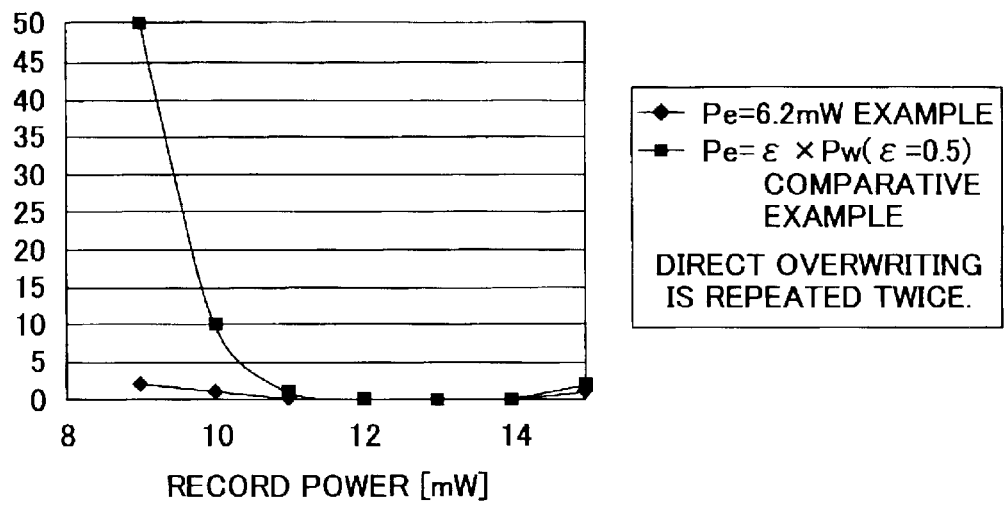
FIG. 13 is a graph illustrating a relationship between a record power and error after direct-overwriting is performed twice.
Figure 14:
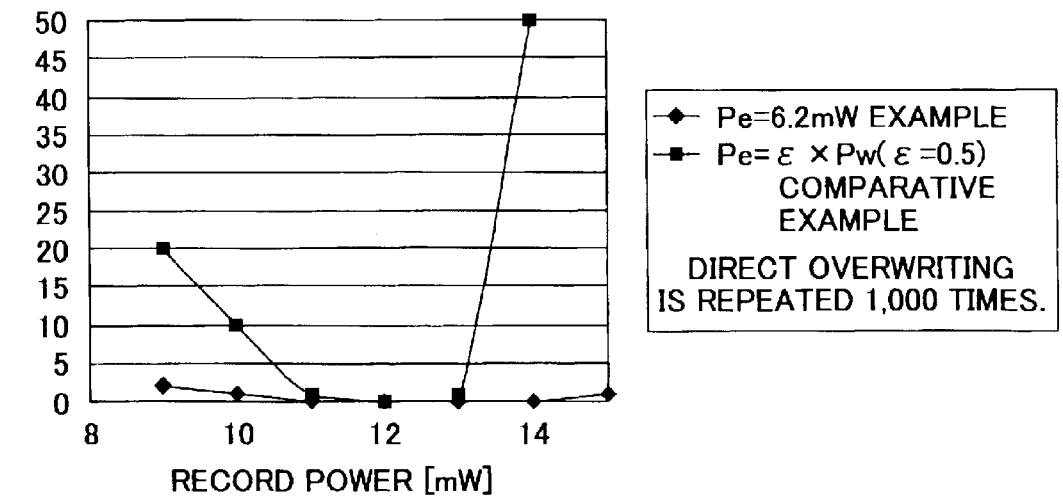
FIG. 14 is a graph illustrating a relationship between a record power and error after direct-overwriting is performed 1,000 times.

FIGS. 13 and 14 illustrate relationships between a record power and a power margin of error in both a case in which direct overwritng is repeated at an erasure power of 6.2 mW (i.e., the method of the present invention) and a case in which direct overwriting is repeated at an erasure power of ε×Pw (ε=0.5) (i.e., a conventional method). FIGS. 13 and 14 illustrate data when the direct overwriting is repeated twice and 1000 times, respectively.

As can be understood from FIGS. 13 and 14, when Pe is 6.2 mW, the power margin, which is one of the direct overwrite characteristics, is dramatically increased. Namely, it is advantageous to fix the erasure power (Peo) in order to perform highly reliable recording.

When a hybrid disc which includes a ROM region which is formed by a stamper is subjected to logical erasing, direct overwriting is performed on the ROM region. In this case, the ROM region is not erased and a logical erase pattern is overwritten in the ROM region, and thereby the ROM becomes impotent. In the thus mistakenly erased hybrid disc, by erasing only the logical erase pattern which is overwritten in the ROM region by the CW erasing method, the ROM region can be restored.

Having generally described this invention, further understanding can be obtained by reference to certain specific examples which are provided herein for the purpose of illustration only and are not intended to be limiting.

EXAMPLES

Example 1

FIGS. 3A–3E are schematic views illustrating arrangement of information in the CD-RW having a ROM portion of the present invention.

Figure 3A:
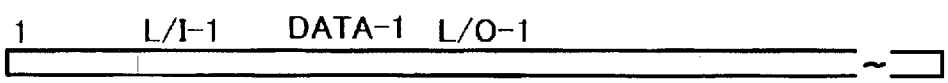
FIG. 3A is a schematic view illustrating a state of the CD-RW of Example 1 which has a ROM region and in which a first session (i.e., L/I-1, Data-1 and L/O-1) is recorded by pits.

FIG. 3A is a schematic view illustrating the CD-RW in a blank state. The following information has been recorded therein by pits.

(1) the position information of the first session located in an area of from 98m13s50f to 98m13s59f;
(2) the lead-in (L/I) area of the first session located in the area of from 98m27s00f to 99m59s74f;
(3) the data (Data) area of the first session located in the area of from 00m00s00f to 04m59s74f; and
(4) the lead-out (L/O) area of the first session located in the area of from 05m00s00f to 06m29s74f.

Figure 3B:
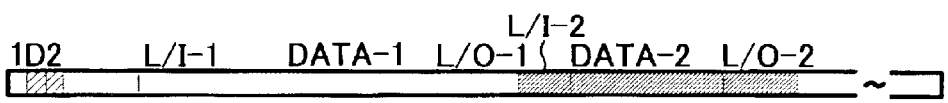
FIGS. 3B to 3E are schematic views illustrating the states of the CD-RW having a ROM region, which correspond to the states of the conventional CD-RW illustrated in FIGS. 2C to 2F.

In the CD-RW as illustrated in FIG. 3B, the following information of the second session is additionally recorded:
(1) the disc ID information located in the area of from 98m13s50f to 98m13s69f;
(2) the position information of the second session in the area located in the area of from 98m13s70f to 98m14s04f; and
(3) the L/I-2, Data-2 and L/O-2 areas of the second session located in an area after the point 06m30s00f.

Figure 3C:
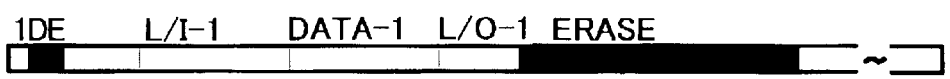

The CD-RW as illustrated in FIG. 3C achieves a state in which the final session (i.e., the second session) of the CD-RW is erased.

In this case, in the program memory area (PMA), the following information is recorded from the inside thereof:

(1) the position information of the first session located in the area of from 98m13s50f to 98m13s59f; and
(2) the disc ID information is recorded in the area located in the area of from 98m13s60f to 98m13s69f.

Figure 3D:
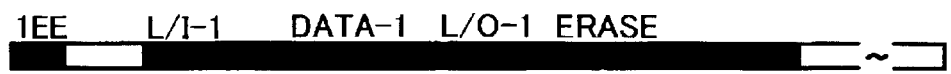

FIG. 3D illustrates a state of the CD-RW, in which the disc ID information is erased in the CD-RW illustrated in 3C. Even when an order to erase the first session of the CD-RW in this state is made, the first session and its position information thereof remain without being erased because the position information of the first session is located before the position of the disc ID information.

Figure 3E:
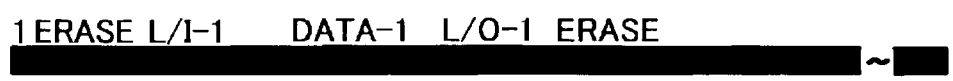

FIG. 3E illustrates a state of the CD-RW in which all are erased except the first session and its position information. The reason why the first session and its position information are not erased is the same as that mentioned above.

In the information recording method and apparatus of the present invention, the PMA is read when the disc is mounted therein. A session whose position information is located after the disc ID information is regarded as a recordable and erasable session. Other sessions are regarded as a non-recordable and non-erasable session. This information is stored in a memory of the apparatus.

Namely, in any states as illustrated in FIGS. 3A–3E, the disc ID information is not located before the position information of the first session, the first session is not a recordable and erasable session, and therefore the first session is recorded in the memory as a non-recordable and non-erasable session (i.e., a write-protected session).

Then the write-protect method performed in the information recording/reproducing apparatus will be explained.

Figure 1:
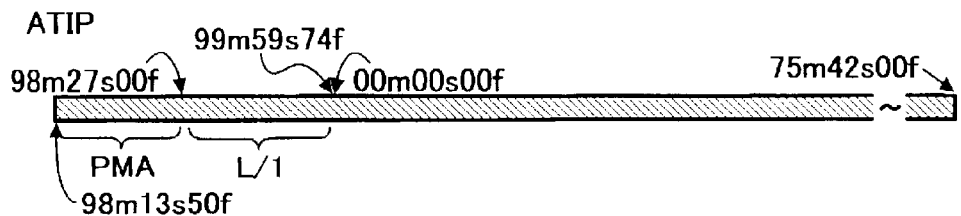
FIG. 1 is a schematic view illustrating arrangement of address data of a conventional CD-RW.
Figure 2A:
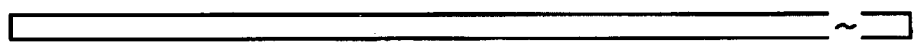
FIG. 2 is a schematic view illustrating a state of a conventional CD-RW in which information is not recorded.
FIG. 2B is a schematic view illustrating a state of the CD-RW, in which a first session (i.e., L/I-1, Data-1 and L/O-1) is recorded in the CD-RW illustrated in FIG. 2A.
FIG. 2C is a schematic view illustrating a state of the CD-RW, in which a second session (i.e., L/I-2, Data-2 and L/O-2) is recorded in the CD-RW illustrated in FIG. 2B.
FIG. 2D is a schematic view illustrating a state of the CD-RW, in which the last session (i.e., the second session) of the CD-RW illustrated in FIG. 2C is erased.
FIG. 2E is a schematic view illustrating a state of the CD-RW, in which the last session (i.e., the first session) of the CD-RW illustrated in FIG. 2D is erased.
FIG. 2F is a schematic view illustrating a state of the CD-RW in which all information in one of the CDE-RW illustrated in FIGS. 2B to 2E is erased.
Figure 2B:
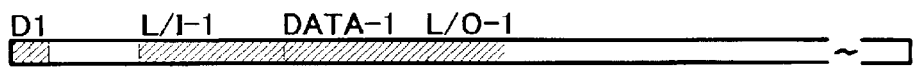
Figure 2C:
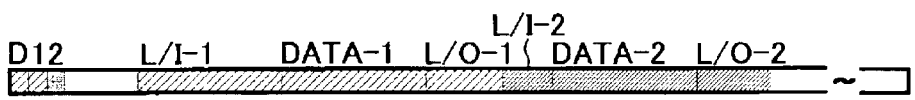

Referring to FIG. 2C, the following information is recorded in the PMA of the CD-RW:
(1) the disc ID information located in the area of from 98m13s50f to 98m13s59f;
(2) the position information of the first session located in the area of from 98m13s60f to 98m13s69f; and
(3) the position information of the second session located in the area of from 98m13s70f to 98m14s04f.

However, the first and second sessions are not write-protected (i.e., not protected against writing).

When the first session is desired to be write-protected, information is re-recorded in the SMA area such that:
(1) the position information of the first session is located in the area of from 98m13s50f to 98m13s59f;
(2) the disc ID information is located in the area of from 98m13s60f to 98m13s69f; and
(3) the position information of the second session is located in the area of from 98m13s70f to 98m14s04f.

Figure 4:
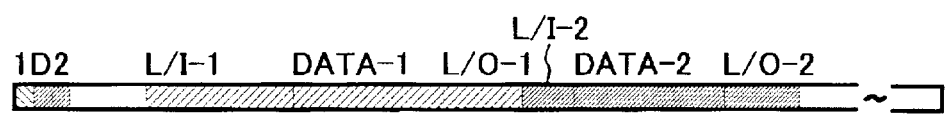
FIG. 4 is a schematic view illustrating a CD-RW in which the first session is write-protected.

This state is illustrated in FIG. 4. Then the disc is re-mounted. The position information of the second session is not changed, and therefore the position information of the second session may not be re-recorded.

As a result, the position information of the first session is located before the disc ID information, and therefore the first session becomes a non-recordable and non-erasable session.

Referring to FIG. 3C, the following information is recorded in the PMA of the CD-RW:
(1) the position information of the first session located in the area of from 98m13s50f to 98m13s59f;
(2) the disc ID information located in the area of from 98m13s60f to 98m13s69f; and
(3) the position information of the second session located in the area of from 98m13s70f to 98m14s04f.

However, the second session is not write-protected.

When the second session is desired to be write-protected, information is re-recorded in the SMA area such that:
(1) the position information of the second session is located in the area of from 98m13s60f to 98m13s69f; and
(2) the disc ID information is located in the area of from 98m13s70f to 98m14s04f.

Figure 5:
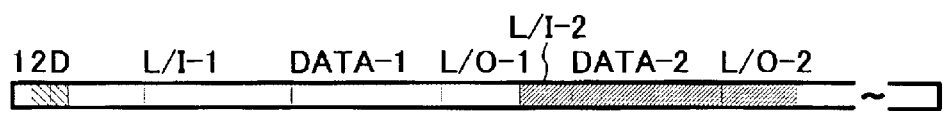
FIG. 5 is a schematic view illustrating a CD-RW having a ROM portion, in which the second session is write-protected.

This state is illustrated in FIG. 5. Then the disc is re-mounted.

In this case, since the first session is write-protected, recording and erasing for the area of from 98m13s50f to 98m13s59f is inhibited. Therefore the first session is not re-recorded.

As a result, the position information of the second session is located before the disc ID information, and therefore the second session becomes a non-recordable and non-erasable session.

When an order to erase the last session is received from a host (such as computers and software), the information recording/reproducing apparatus erases the last session if the last session is the recordable and erasable session which is stored in the memory of the apparatus. Otherwise, the apparatus answers the host that the order is refused.

When an order to perform complete erasure (or quick erasure) is received, the apparatus performs the complete erasure if there is no non-recordable and non-erasable session in the memory of the apparatus. Otherwise, the apparatus answers the host that the complete erasure order is refused.

Example 2

Figure 6:
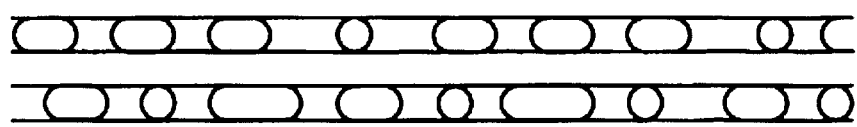
FIG. 6 is a schematic view illustrating data in a first session which do not have a wobble signal.
Figure 9:
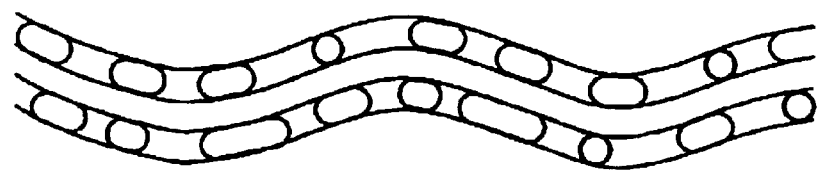
FIG. 9 is a schematic view illustrating a state of an optical information recording medium in which pits and inter-pit grooves are formed while wobbled.

A phase change optical information recording medium of the present invention was prepared. The recording medium includes a PMA of the first session at a position of 98m13s50f, which has a wobble signal; a L/I area of the first session at a position ranging from 98m27s00f to 99m59s74f, which has a wobble signal as illustrated in FIG. 9; a Data area of the first session at a position ranging from 00m00s00f to 04m59s74f, which does not have a wobble signal as illustrated in FIG. 6; and a L/O area of the first session at a position ranging from 05m00s00f to 06m29s74f, which has a wobble signal as illustrated in FIG. 9. The PMA and L/I, Data and L/O areas are formed of pits. In other areas, a guide groove having a wobble signal is formed on a substrate. Thus, a CD-RW including ATIP information was prepared.

As mentioned above, at least the first session including pits is formed on the substrate. Namely, the first session includes a ROM area which does not include a wobble signal and a RAM area which includes a wobble signal. Therefore, the ROM area and RAM area can be identified by checking whether a wobble signal in present therein.

Figure 7:
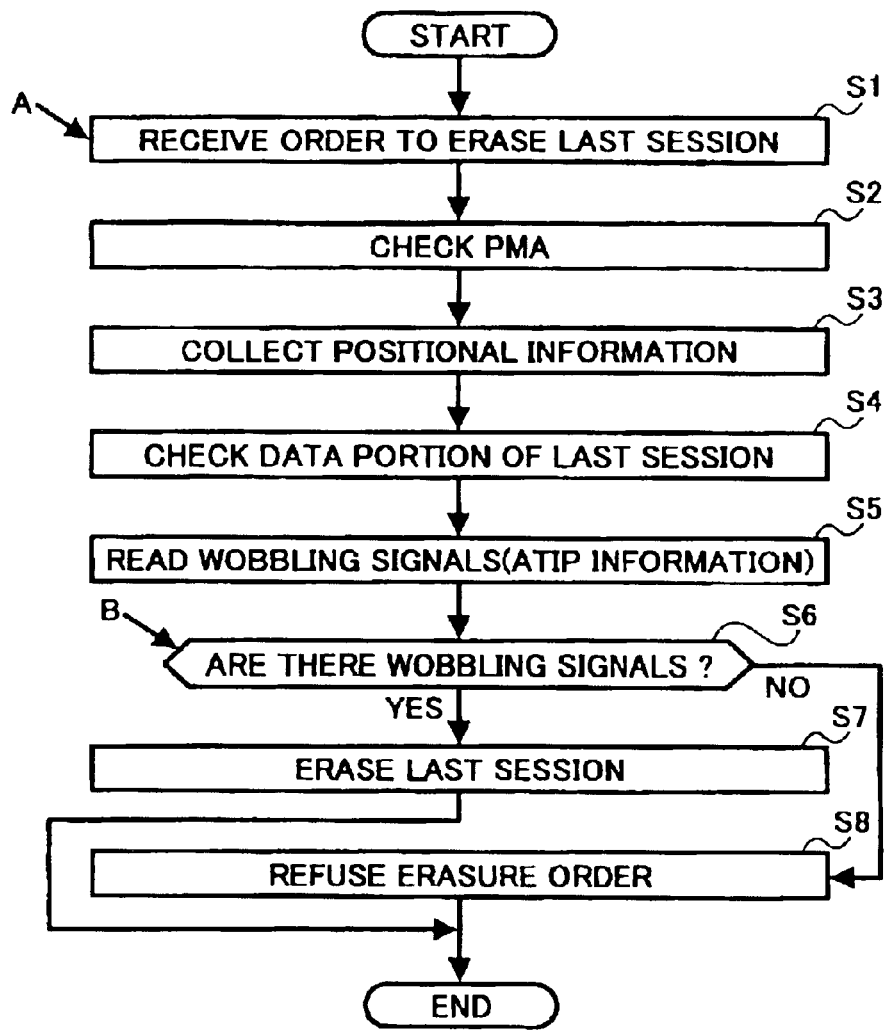
FIG. 7 is a flowchart for explaining erasing process of the image recording method of the present invention.
Figure 8:
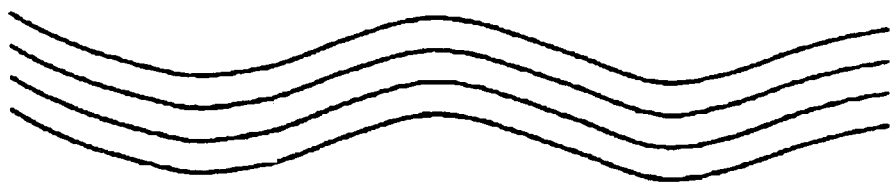
FIG. 8 is a schematic view illustrating wobbled guide grooves.

The optical information recording/reproducing apparatus of the present invention includes a judging device B which is illustrated in FIG. 7. The judging device B judges that a data area of a session of a recording medium is a ROM when the session does not include a wobble signal. When the data area of the session includes a wobble signal, the judging device B judges that the session is a RAM. The apparatus also includes a receiving device A which is also illustrated in FIG. 7. When the receiving device A receives an order to erase a session of a recording medium, the recording/reproducing apparatus erases the session when the session only includes a RAM (i.e., the session does not include a ROM).

FIG. 7 is a flowchart illustrating an erasure operation of the optical information recording/reproducing apparatus of the present invention.

When the receiving device receives an order to erase a last session from a host such as computers and software (step S1), the recording/reproducing apparatus checks the PMA of a recording medium to determine the position of the last session (steps S2 and S3).

Figure 2D:
Figure 2E:
Figure 2F:

Then the recording/reproducing apparatus checks the data area of the last session (i.e., Data-2 in FIG. 2C, and Data-1 in FIG. 2B or 2D) (step S4) to read a wobble signal (i.e., ATIP information) in the data area (step S5).

When a wobble signal is present in the data area (step S6, Yes), the judging device B judges that the last session is not a ROM and the recording/reproducing apparatus erases the last session (step S7). To the contrary, when a wobble signal is not present in the data area (step S6, No), the judging device B judges that the last session is a ROM and the recording/reproducing apparatus answers the host that the last session cannot be erased (step S8).

When the receiving device A receives a complete erasure order (i.e., a quick erasure order) from a host, the recording/reproducing apparatus checks PMA of a recording medium to determine the position of the first session.

Then the recording/reproducing apparatus checks the data area of the first session to read a wobble signal (i.e., ATIP information) in the data area.

When a wobble signal is present in the data area, the judging device B judges that the first session is not a ROM and the recording/reproducing apparatus performs the complete erasure (i.e., the quick erasure). To the contrary, when a wobble signal is not present in the data area, the judging device B judges that the first session is a ROM and the recording/reproducing apparatus answers the host that the complete erasure cannot be performed.

Additional modifications and variations of the present invention are possible in light of the above teachings. It is therefore to be understood that within the scope of the appended claims the invention may be practiced other than as specifically described herein.

This document claims priority and contains subject matter related to Japanese Patent Applications Nos. 2001-291047, 2001-353386 and 2002-022482, filed on Sep. 25, 2001, Nov. 19, 2001 and Jan. 30, 2002, the entire contents of which are herein incorporated by reference.

What is claimed is:

1. A phase change optical information recording medium comprising:

a substrate; and a recording layer which is located overlying the substrate and in which marks are to be formed to store information, wherein the substrate includes plural sessions including a first session in which pits are formed and which includes a RAM region including a groove and a wobble signal, and a program memory area in which pits are formed and which includes position information of the first session and does not include disc ID information of the phase change optical information recording medium.

2. The phase change optical information recording medium according to claim 1, wherein the first session further includes a ROM region including a data area including no wobble signal.

3. The phase change optical information recording medium according to claim 1, further comprising a first dielectric layer located between the substrate and the recording layer, a second dielectric layer located overlying the recording layer, a reflection layer located overlying the second dielectric layer and an overcoat layer located overlying the reflection layer.

4. The phase change optical information recording medium according to claim 1, wherein the recording layer comprises Ag, In, Sb and Te as main components with respective atomic percents $\alpha$, $\beta$, $\gamma$ and $\delta$ thereof being in the relationship of $\alpha+\beta+\gamma+\delta=100$, $0<\alpha\leq10$, $2\leq\beta\leq12$, $55\leq\gamma\leq70$ and $22\leq\delta<32$.

5. The phase change optical information recording medium according to claim 4, wherein the recording layer further comprises an element selected from the group consisting of 3B group elements, 4B group elements and 5B group elements.

6. The phase change optical information recording medium according to claim 1, wherein the recording layer comprises Ge, Ga, Sb and Te as main components with respective atomic percents $\alpha$, $\beta$, $\gamma$ and $\delta$ thereof being in the relationship of $\alpha+\beta+\gamma+\delta=100$, $0<\alpha\leq10$, $1\leq\beta\leq12$, $55\leq\gamma<85$ and $12\leq\delta\leq32$.

7. The phase change optical information recording medium according to claim 6, wherein the recording layer further comprises an element selected from the group consisting of 3B group elements, 4B group elements and 5B group elements.

* * * * *